(12) United States Patent
Takiguchi et al.

(10) Patent No.: US 12,415,934 B2
(45) Date of Patent: Sep. 16, 2025

(54) METAL PLATE COATING MATERIAL AND COATED METAL PLATE PRODUCTION METHOD USING SAME

(71) Applicant: NIPPON STEEL COATED SHEET CORPORATION, Tokyo (JP)

(72) Inventors: Keiko Takiguchi, Tokyo (JP); Masaki Satou, Tokyo (JP); Seiju Suzuki, Tokyo (JP); Takafumi Kawagoe, Tokyo (JP)

(73) Assignee: NIPPON STEEL COATED SHEET CORPORATION, Tokyo (JP)

( * ) Notice: Subject to any disclaimer, the term of this patent is extended or adjusted under 35 U.S.C. 154(b) by 261 days.

(21) Appl. No.: 17/760,451

(22) PCT Filed: Feb. 8, 2021

(86) PCT No.: PCT/JP2021/004644
§ 371 (c)(1),
(2) Date: Mar. 2, 2023

(87) PCT Pub. No.: WO2021/161968
PCT Pub. Date: Aug. 19, 2021

(65) Prior Publication Data
US 2023/0183513 A1   Jun. 15, 2023

(30) Foreign Application Priority Data
Feb. 12, 2020   (JP) ................ 2020-021403

(51) Int. Cl.
*C09D 127/16* (2006.01)
*C09D 5/00* (2006.01)
*C09D 7/65* (2018.01)

(52) U.S. Cl.
CPC ............. *C09D 127/16* (2013.01); *C09D 5/00* (2013.01); *C09D 7/65* (2018.01)

(58) Field of Classification Search
CPC ... B05D 7/14; B05D 3/08; B05D 5/00; B05D 7/24; C09J 7/29; C09D 127/16; C09D 127/12; C09D 201/10; C09D 12/16
See application file for complete search history.

(56) References Cited

U.S. PATENT DOCUMENTS

| | | | |
|---|---|---|---|
| 4,942,211 A | | 7/1990 | Sommer et al. |
| 5,457,166 A | * | 10/1995 | Yoshikawa ........ C08G 63/6954 528/14 |
| 5,635,572 A | | 6/1997 | Ohnishi |
| 2016/0017195 A1 | | 1/2016 | Pichl et al. |
| 2020/0087537 A1 | | 3/2020 | Satou et al. |

FOREIGN PATENT DOCUMENTS

| | | | |
|---|---|---|---|
| CA | 2175545 | * | 12/1996 |
| CN | 101754852 | * | 12/2014 |
| CN | 104403486 A | | 3/2015 |
| CN | 108676441 A | | 10/2018 |
| CN | 110494518 A | | 11/2019 |
| JP | 02-008249 | | 1/1990 |
| JP | H05255638 A | | 10/1993 |
| JP | 08-012921 A | | 1/1996 |
| JP | 10-128232 A | | 5/1998 |
| JP | 2002-129110 A | | 5/2002 |
| JP | 2004-043559 A | | 2/2004 |
| JP | 2011-052115 A | | 3/2011 |
| JP | 2016-516101 A | | 6/2016 |
| JP | 2019-006931 A | | 1/2019 |
| WO | 94/06870 A1 | | 3/1994 |
| WO | 2018/180831 | * | 4/2018 |
| WO | 2018180831 A1 | | 10/2018 |
| WO | 2019/155361 | * | 8/2019 |
| WO | 2019159385 A1 | | 8/2019 |

* cited by examiner

*Primary Examiner* — Tabassom Tadayyon Eslami
(74) *Attorney, Agent, or Firm* — Shih IP Law Group, PLLC

(57) ABSTRACT

The present invention addresses the problem of providing: a metal plate coating material with which it is possible to form a coating film that has extremely high storage stability, that does not exhibit yellowing, and that is not prone to staining with rain streaks; and a method for producing a coated metal plate using the metal plate coating material. The metal plate coating material for solving the problem contains: at least one of a mixture of a fluorine-containing resin and a (meth) acrylic resin and a copolymer of a fluorine-containing monomer and a (meth)acrylic group-containing monomer; a silicone resin; and a zinc carboxylate salt catalyst.

5 Claims, No Drawings

METAL PLATE COATING MATERIAL AND COATED METAL PLATE PRODUCTION METHOD USING SAME

TECHNICAL FIELD

The present invention relates to a coating material for metal sheets and a method for producing a coated metal sheet using the same.

BACKGROUND ART

Coated metal sheets are frequently used in outdoor constructions, civil engineering structures and the like. In the case where long-term durability is required for coated metal sheets, fluorine-containing resin-based coating materials with excellent weather resistance and mechanical properties as the coating material for the coating film disposed on the surface side are often used. Such coated metal sheets suffer stains due to adherence of carbon-based pollutional material (hereinafter also referred to as "hydrophobic carbon") contained in exhaust from automobiles, industrial smoke and the like. Among stains, stains adhering along rain streaks (hereinafter also referred to as "rain-streak stain") are particularly noticeable. Even on coated metal sheets onto which fluorine-containing resin-based coating materials have been baked, it is inevitable that rain-streak stains noticeably appear within a relatively short time. Therefore, there is a need to provide coated metal sheets on which rain-streak stains are not easily generated.

In recent years, it has been proposed to prevent a rain-streak stain by employing a coating film having a water contact angle of 60° or less, namely a hydrophilic coating film. On the surface of a hydrophilic coating film having a low water contact angle, it is believed that hydrophobic carbon is more likely to leave the surface with rainwater and thus washed away. As one example of the approach for hydrophilizing the surface of a coated metal sheet, methods have been proposed, in which tetraalkoxysilane or a condensate thereof (hereinafter also referred to as an "organosilicate") is contained in the coating material (PTLS 1 to 3).

The coating materials described in the above PTLS 1 to 3 contain various resins and organosilicates. When such coating materials are applied to the surface of the metal sheet, organosilicates move to the surface side of the film. Then, when curing the film, organosilicates react with moisture or the like in the air to produce silanol groups or siloxane bonds on the surface of the coating film. As a result of this, it is believed that the surface of the coating film is hydrophilized and rain-streak stains are suppressed.

However, organosilicates are highly reactive and easily react with moisture in the coating materials. Accordingly, coating materials containing organosilicates have low storage stability, and in coating materials where time has passed after the addition of organosilicates, it has been difficult for the organosilicates to move to the surface, making it difficult to sufficiently hydrophilize the surface of the coating film.

Therefore, containment of silicone resins in coating materials instead of organosilicates has been examined by the present inventors. For example, PTL 4 proposes adding a silicone resin and a block sulfonic acid catalyst to a coating material containing a polyester resin and a melamine resin-based curing agent. The block sulfonic acid catalyst is a catalyst for curing silicone resins.

CITATION LIST

Patent Literature

PTL 1
  WO1994/6870
PTL 2
  Japanese Patent Application Laid-Open No. H08-12921
PTL 3
  Japanese Patent Application Laid-Open No. H10-128232
PTL 4
  Japanese Patent Application Laid-Open No. 2019-006931

SUMMARY OF INVENTION

Technical Problem

Compared to organosilicates, the silicone resin described in PTL 4 has milder reactivity and is less likely to react with moisture in the coating material. Also, due to its three dimensional structure, it tends to be concentrated on the surface after application of the coating material. Therefore, by applying a coating material containing such a silicone resin and subjecting the cured film to a flame treatment, the surface of the coating film can be easily hydrophilized (replacing the organic groups of the silicone resin with OH groups or siloxane bonds). That is, a coating material containing the silicone resin provides a coating film that has very high hydrophilicity and is less likely to suffer the occurrence of rain-streak stains.

Then, as in PTL 4, it is also considered to add a silicone resin and a block sulfonic acid catalyst to a coating material containing a fluororesin and an acrylic resin. However, for such a coating material, there has been a problem in that yellowing may occur when the coating film is baked, making it difficult to obtain a coating film with a uniform color.

The present invention has been completed in view of the above circumstances. That is, an object of the present invention is to provide a coating material for metal sheets that has very high storage stability, and can also form a coating film that is not yellowed and is less likely to suffer the occurrence of rain-streak stains, and a method for producing a coated metal sheet using the same.

Solution to Problem

A first aspect of the present invention relates to the following coating material for metal sheets.

[1] A coating material for metal sheets, comprising:
  at least one of a mixture of a fluorine-containing resin and a (meth)acrylic resin and a copolymer of a fluorine-containing monomer and a (meth)acrylic group-containing monomer;
  a silicone resin; and
  a zinc carboxylate salt catalyst.

[2] The coating material for metal sheets according to claim 1, wherein the zinc carboxylate salt catalyst has a structure represented by the following general formula (1):

[Formula 1]

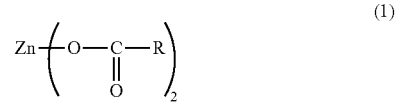

(1)

wherein R in the general formula (1) represents a linear or branched alkyl group comprising 1 to 18 carbon atoms or an aryl group comprising 6 to 18 carbon atoms.

[3] The coating material for metal sheets according to [2], wherein the above general formula (1) is zinc bis(2-ethylhexanoate).

[4] The coating material for metal sheets according to any one of [1] to [3], wherein the silicone resin contains silanol groups in an amount of 5 to 50 mol % relative to a total number of moles of Si atoms.

A second aspect of the present invention relates to the following method for producing a coated metal sheet.

[5] A method for producing a coated metal sheet, comprising:
    forming a coating film on a surface of a metal sheet by applying and curing the coating material for metal sheets according to any one of claims 1 to 4; and
    subjecting the coating film to a flame treatment.

Advantageous Effects of Invention

In a coating film obtained from the coating material for metal sheets according to the present invention, yellowing is less likely to occur, providing a coating film with a uniform color. Furthermore, the coating film obtained from the coating material for metal sheets is less likely to suffer the occurrence of rain-streak stains on the surface and has high scratch resistance. In addition, the coating material for metal sheets has very high storage stability.

DESCRIPTION OF EMBODIMENTS

1. Coating Material for Metal Sheets

The present invention relates to a coating material for metal sheets applied to the surface of a metal sheet in order to protect the metal sheet and to prevent rain-streak stains. The coating material for metal sheets is used by, for example, applying it on a metal sheet and then subjecting the surface of the coating film to a flame treatment.

As previously mentioned, a coating material for metal sheets containing a silicone resin can provide a coating film that has high scratch resistance and is less likely to suffer the occurrence of rain-streak stains. However, when a sulfonic acid-based catalyst is used as a catalyst for curing the silicone resin in the coating material for metal sheets, the coating film tends to be yellowed depending on the baking conditions of the coating film, and the color of the coating film is difficult to be consistent.

The reason for the yellowing of the coating film when a sulfonic acid-based catalyst is used is not certain, but it is thought to be as follows. Normally, in fluorine-based coating materials, a mixed resin of a fluorine-based resin and a (meth)acrylic resin or a copolymer between a fluorine-containing monomer and a (meth)acrylic group-containing monomer is used as a binder. In such coating materials, when a sulfonic acid-based catalyst is used, it is thought that the catalyst is likely to excessively accelerate the curing of the acrylic resin, resulting in yellowing. In addition, it is thought that, as the degree of curing of the acrylic resin varies depending on the conditions during baking, the degree of yellowing also varies, thus making it difficult for the color of the coating film to be consistent.

In contrast, the coating material for metal sheets according to the present invention comprises: at least one of a mixture of a fluorine-containing resin and a (meth)acrylic resin and a copolymer between a fluorine-containing monomer and a (meth)acrylic group-containing monomer; a silicone resin; and a zinc carboxylate salt catalyst. The zinc carboxylate salt catalyst functions well as a curing catalyst for the silicone resin. Therefore, a coating film that has high scratch resistance and is less likely to suffer the occurrence of rain-streak stains can be obtained. Meanwhile, the zinc carboxylate salt catalyst is unlikely to interact with resin components, especially (meth)acrylic groups, and thus is unlikely to cause yellowing of the coating film and other problems. Furthermore, the zinc carboxylate salt catalyst is unlikely to react with the silicone resin during storage of the coating material for metal sheets, thus resulting in the coating material with very satisfactory storage stability.

In the following, each component in the coating material for metal sheets according to the present invention will be described in detail.

(1) Zinc Carboxylate Salt Catalyst

The zinc carboxylate salt catalyst is a compound that acts as a curing catalyst for the silicone resin, which will be mentioned later, and is not particularly limited as long as it is a compound having zinc and carboxyl groups in the molecule. The coating material for metal sheets may include only one zinc carboxylate salt catalyst or two or more zinc carboxylate salt catalysts.

Examples of the zinc carboxylate salt catalyst include compounds having a structure represented by the following general formula (1).

[Formula 2]

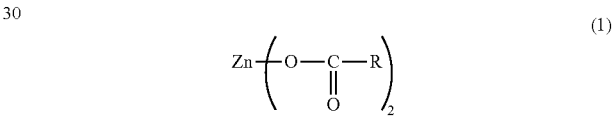

In the above general formula (1), R represents a linear or branched alkyl group having 1 to 18 carbon atoms or an aryl group having 6 to 18 carbon atoms. In such a zinc carboxylate salt catalyst, the two carboxyl groups bonded to zinc may be the same as or different from each other.

Examples of the alkyl group having 1 to 18 carbon atoms represented by R in the above general formula (1) include methyl group, ethyl group, propyl group, isopropyl group, pentyl group, and hexyl group. Meanwhile, examples of the aryl group having 6 to 18 carbon atoms represented by R in the above general formula (1) include phenyl group, naphthyl group, and azulene group. Among them, 2-ethylhexyl acid is preferred as the coordination compound in the general formula (1) from the viewpoint of availability, stability, curability of the silicone resin, and the like. That is, the zinc carboxylate salt catalyst is preferably zinc bis(2-ethylhexanoate).

Here, the above zinc carboxylate salt catalyst may be prepared or may be a commercial product. Examples of the commercial product include Octope Zn (manufactured by Hope Chemical Co., Ltd.), Zn-OCTOATE (manufactured by DIC Corporation), and D-15 (manufactured by Shin-Etsu Chemical Co., Ltd.).

The amount of the zinc carboxylate salt catalyst contained in the coating material for metal sheets is appropriately selected depending on the amount of the silicone resin, but normally, it is preferably 0.01 to 1 part by mass and more preferably 0.04 to 0.36 parts by mass relative to 100 parts by mass of the total solid content of the coating material for metal sheets. In addition, it is preferably 1 to 10 parts by mass and more preferably 2 to 6 parts by mass relative to 100 parts by mass of the silicone resin. When the amount of the zinc carboxylate salt catalyst is within the range described above, the silicone resin is likely to be cured efficiently and a coating film with high hardness is likely to be obtained.

(2) Silicone Resin

The "silicone resin" in the present specification refers to a compound in which alkoxysilane is partially hydrolyzed and condensed. This compound mainly has a three dimensional crosslinked structure but does not reach the state of gel, and is a polymer that is soluble in an organic solvent. The three dimensional crosslinked structure that the silicone resin includes is not particularly limited, and for example, it may be any of cage-shaped, ladder-shaped or random shaped. Note that, in the present specification, the silicone resin does not include tetraalkoxysilane or a condensate formed by hydrolyzing and condensing tetraalkoxysilane only (organosilicate).

Since the silicone resin includes a three dimensional crosslinked structure, when the coating material for metal sheets is applied to the metal sheet, the silicone resin is transferred to the surface side of the film and arranged uniformly along the surface of the film. When such a silicone resin is cured by the zinc carboxylate salt catalyst mentioned above and then subjected to a flame treatment, organic groups (such as methyl groups or phenyl groups) that the silicone resin contains are removed evenly, and silanol groups or siloxane bonds are introduced to the surface of the coating film. As a result, hydrophilicity of the surface of the coating film (coated metal sheet) is uniformly increased, providing very satisfactory rain-streak stain resistance. In addition, since the cured product of the silicone resin is arranged uniformly on the surface of the coating film, scratch resistance of the coating film is also satisfactory.

As mentioned above, the silicone resin is a compound in which alkoxysilane is partially hydrolyzed and condensed, and in its molecular chain, any one or two or more of T-1 unit to T-3 unit, represented by the following general formulas, derived from trialkoxysilane (all of which are also collectively referred to as "T units") are normally included.

[Formula 3]

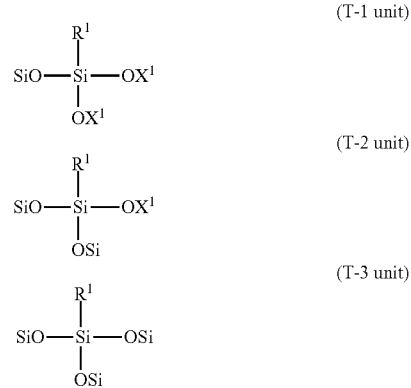

In the general formulas described above, $R^1$ represents a hydrocarbon group that optionally has a substituent. In addition, $X^1$ represents a hydrogen atom or a hydrocarbon group. In the silicone resin, multiple types of T units with different types of above-described $R^1$ and $X^1$ may be included.

$R^1$ is preferably a hydrocarbon group having 1 to 12 carbon atoms, and specific examples thereof include alkyl groups such as methyl group, ethyl group, propyl group, hexyl group and octyl group; aryl groups such as phenyl group, tolyl group, xylyl group and naphthyl group; cycloalkyl groups such as cyclohexyl group, cyclobutyl group and cyclopentyl group; and the like. Among them, methyl group and phenyl group are particularly preferred.

Meanwhile, $X^1$ is preferably a hydrogen atom or a hydrocarbon group having 1 to 8 carbon atoms, and examples of the hydrocarbon group include alkyl groups such as methyl group, ethyl group, propyl group and hexyl group; aryl groups such as phenyl group, tolyl group and xylyl group; cycloalkyl groups such as cyclohexyl group, cyclobutyl group and cyclopentyl group; and the like. Among them, methyl group and ethyl group are particularly preferred.

In addition, in the molecular chain of the silicone resin, either one or both of D-1 unit and D-2 unit, represented by the following general formulas, derived from dialkoxysilane (all of which are also collectively referred to as "D units") may be included.

[Formula 4]

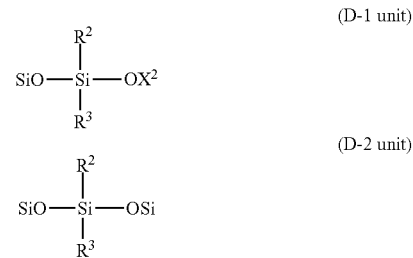

In the general formulas described above, $R^2$ and $R^3$ each independently represent a hydrocarbon group that optionally has a substituent. In addition, $X^2$ represents a hydrogen atom or a hydrocarbon group. Note that, in the silicone resin, multiple types of D units with different types of above-described $R^2$, $R^3$ and $X^2$ may be included.

Each of $R^2$ and $R^3$ is preferably a hydrocarbon group having 1 to 12 carbon atoms, and specific examples thereof include the same groups as above-mentioned $R^1$ for T units. Meanwhile, $X^2$ is preferably a hydrogen atom or a hydrocarbon group having 1 to 8 carbon atoms, and specific examples thereof include the same groups as above-mentioned $X^1$ for T units.

Furthermore, in the molecular chain of the silicone resin, any one or two or more of Q-1 unit to Q-4 unit, represented by the following general formulas, derived from tetraalkoxysilane (all of which are also collectively referred to as "Q units") may be included.

[Formula 5]

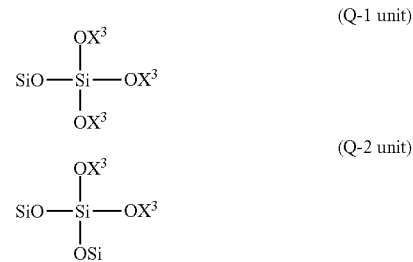

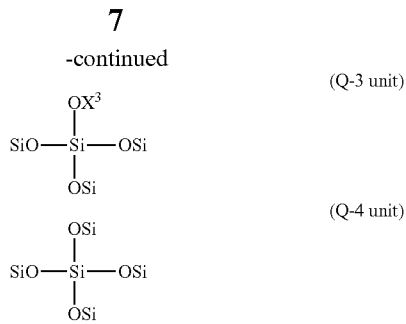

(Q-3 unit)

(Q-4 unit)

In the general formulas described above, $X^3$ represents a hydrogen atom or a hydrocarbon group. Note that, in the silicone resin, multiple types of Q units with different types of above-described $X^3$ may be included.

$X^3$ is preferably a hydrogen atom or a hydrocarbon group having 1 to 8 carbon atoms, and specific examples thereof include the same groups as above-mentioned $X^1$ for T units.

The silicone resin has a structure in which the above-described T units, D units and/or Q units are bonded in a three dimensional manner. The amount (number of moles) of silanol groups in the silicone resin contained in the coating material for metal sheets according to the present invention is 5 to 50 mol % and more preferably 15 to 40 mol % relative to the total number of moles of Si atoms. When the amount of silanol groups is greater than 50 mol % relative to the total number of moles of Si atoms, the reactivity of the silicone resin may be increased, and even when the zinc carboxylate salt catalyst mentioned above is used, the storage stability of the coating material for metal sheets may be lowered. On the other hand, when the amount of silanol groups is less than 5 mol % relative to the total number of moles of Si atoms, the silicone resin is unlikely to be bonded to itself, or to other components in the coating material for metal sheets via hydrogen bonding, and the silicone resin may be evaporated upon curing the coating material for metal sheets. Furthermore, when the amount of silanol groups is less than 5 mol %, the silicone resin is unlikely to be sufficiently crosslinked upon curing the coating material for metal sheets, and the scratch resistance of the coating film may not be enhanced sufficiently.

In contrast, when the amount of silanol groups in the silicone resin is in the range described above, not only the storage stability of the coating material for metal sheets is enhanced, but also the silicone resin is unlikely to be evaporated upon curing the film composed of the coating material for metal sheets and the heating apparatus or the like is unlikely to be fouled. Furthermore, the scratch resistance of the coating film composed of the coating material for metal sheets becomes satisfactory as well.

The number of moles of Si contained in the silicone resin and the amount of silanol groups contained in the silicone resin can be specified through analysis with $^{29}$Si-NMR and analysis with $^{1}$H-NMR. In addition, the amount of silanol groups in the silicone resin can be adjusted through the charging ratio of T units, D units and Q units, or the degree of condensation reaction. For example, when trialkoxysilane is used to prepare a silicone resin, by prolonging the duration for condensation reaction or the like, the amount of T-3 unit is increased and the amount of silanol groups is decreased.

Moreover, the silicone resin contains Si atoms derived from trialkoxysilane, that is, Si atoms constituting T units preferably in an amount of 50 to 100 mol % and more preferably in an amount of 60 to 100 mol % relative to the total number of moles of Si atoms that the silicone resin contains. When the amount of T units is less than 50 mol % (in particular, when the amount of D units is greater than 50 mol %), the silicone resin tends to form a micelle structure and the silicone resin is likely to be enriched in the form of sea-island on the surface of the coating film. As a result, it is hard to uniformly enhance hydrophilicity or hardness of the surface of the coating film, and unevenness in scratch resistance or rain-streak stain resistance of the coating film is likely to occur. Note that whether the silicone resin is enriched in the form of sea-island on the surface of the coating film or not can be confirmed by analyzing the surface of the coating film after the flame treatment with an AFM (atomic force microscope). For example, the etching depth through the flame treatment in the sea part is different from that in the island part on the surface of the coating film. Accordingly, the sea-island distribution of the silicone resin can be confirmed through irregularities on the surface of the coating film.

In contrast, when the amount of T units is 50 mol % or more, the silicone resin is unlikely to form a micelle structure and the silicone resin is likely to be enriched uniformly on the surface of the coating film. As a result, the rain-streak stain resistance of a coated metal sheet to be obtained by applying the coating material for metal sheets becomes satisfactory, or the scratch resistance of the coating film becomes satisfactory. The amount of Si atoms constituting T units can be specified through analysis with $^{29}$Si-NMR.

In addition, when the silicone resin contains alkyl groups and aryl groups, the molar ratio of the number of moles of aryl groups directly bonded to Si atoms of the silicone resin based on the number of moles of alkyl groups directly bonded to Si atoms, that is, the molar ratio of aryl groups: alkyl groups is preferably 0 to 80:100 to 20 and more preferably 0 to 70:100 to 30. When the molar ratio of aryl groups is increased, the silicone resin is more likely to be dissolved in other components in the coating material for metal sheets. In addition, the storage stability of the coating material is likely to be enhanced as well. However, when the proportion of aryl groups becomes excessive, the reaction speed upon formation of the coating film is decreased significantly, and it may be hard to obtain a sufficient crosslinking density. The above-described ratio of alkyl groups and aryl groups can be specified through analysis with $^{1}$H-NMR.

Here, the weight average molecular weight of the silicone resin is preferably 700 to 50,000 and more preferably 1,000 to 10,000. When the weight average molecular weight of the silicone resin is less than 700, the silicone resin is likely to be evaporated upon curing the coating material for metal sheets, and therefore, the heating apparatus may be fouled or the hardness of the coating film tend to be decreased. On the other hand, when the weight average molecular weight is greater than 50,000, the viscosity of the coating material for metal sheets is likely to be increased and the storage stability tends to be lowered. Note that the above-described weight average molecular weight of the silicone resin is in terms of polystyrene, measured by gel permeation chromatography (GPC).

The coating material for metal sheets contains the silicone resin preferably in an amount of 1 to 10 parts by mass and more preferably in an amount of 2 to 6 parts by mass relative to 100 parts by mass of the solid content of the coating material. When the coating material for metal sheets contains the silicone resin in an amount within the range described above, hydrophilicity of the surface of a coating film to be obtained can be enhanced sufficiently and rain-streak stains are unlikely to occur. In addition, the hardness of the surface of the coating film is also increased.

The silicone resin mentioned above can be prepared through hydrolytic polymerization of trialkoxysilane or the like. Specifically, alkoxysilane such as trialkoxysilane or a partial condensate thereof is dispersed in water or a solvent such as an alcohol. Then, the pH of that dispersion is preferably adjusted to 1 to 7, and more preferably to 2 to 6, and alkoxysilane or the like is hydrolyzed. Subsequently, by subjecting the hydrolysate to dehydrative condensation, the silicone resin is obtained. The molecular weight or the like of a silicone resin to be obtained can be adjusted through the duration of dehydrative condensation or the like. The condensation of the hydrolysate can be carried out in succession with the above-described hydrolysis, and the condensation reaction can be accelerated by evaporating an alcohol produced through the hydrolysis or water.

Note that alkoxysilane used for preparation of the silicone resin is appropriately selected depending on a desired structure of the silicone resin. Examples of the trialkoxysilane compound include methyltrimethoxysilane, methyltriethoxysilane, methyltriisopropoxysilane, methyltributoxysilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, hexyltrimethoxysilane, decyltrimethoxysilane, octadecyltrimethoxysilane, phenyltrimethoxysilane, phenyltriethoxysilane, methyltrisilanol, phenyltrisilanol and the like.

Examples of dialkoxysilane include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, diphenyldimethoxysilane and the like.

Furthermore, examples of tetraalkoxysilane include tetramethoxysilane, tetraethoxysilane, tetraisopropoxysilane, tetrabutoxysilane, tetramethoxysilane and the like.

Upon preparation of the silicone resin, partial condensates of the above-described trialkoxysilane, dialkoxysilane, and tetramethoxysilane may be used as a raw material.

(3) Mixture of Fluorine-Containing Resin and (Meth) Acrylic Resin or Copolymer Between Fluorine-Containing Monomer and (Meth)Acrylic Group-Containing Monomer The coating material for metal sheets according to the present invention contains either one of, or both of, a mixture of a fluorine-containing resin and a (meth)acrylic resin and a copolymer between a fluorine-containing monomer and a (meth)acrylic group-containing monomer. They are components that serve as binders in the coating film. In the present specification, (meth)acrylic refers to either methacrylic or acrylic, or both.

(Mixture of Fluorine-Containing Resin and (Meth)Acrylic Resin)

The fluorine-containing resin may be any resin as long as it contains fluorine in its molecule, and there is no particular limitation on its type. Examples of the fluorine-containing resin include polyvinylidene fluoride. The polyvinylidene fluoride can be a vinylidene fluoride homopolymer or a copolymer between vinylidene fluoride and another monomer. However, the polyvinylidene fluoride contains structural units derived from vinylidene fluoride preferably in an amount of 50 mol % or more and more preferably in an amount of 60 mol % or more relative to the total amount of structural units constituting the fluorine-containing resin.

Examples of the monomer that is copolymerizable with vinylidene fluoride include fluoroolefins, vinyl ethers, vinyl esters, allyl ethers, allyl esters, isopropenyl ethers, isopropenyl esters, metallyl ethers, metallyl esters, α-olefins, and (meth)acrylate esters. The polyvinylidene fluoride may contain only one of the structures derived from these monomers or two or more of them.

Examples of the above-described fluoroolefin include fluoroolefins having 2 to 3 carbon atoms such as tetrafluoroethylene, chlorotrifluoroethylene, trifluoroethylene, hexafluoropropylene, and pentafluoropropylene.

Examples of the above-described vinyl ether include alkyl vinyl ethers such as ethyl vinyl ether, butyl vinyl ether, cyclohexyl vinyl ether, fluoroalkyl vinyl ethers, and perfluoro(alkyl vinyl ethers).

Examples of the above-described vinyl ester include fatty acid vinyl esters such as ethenyl 2,2-dimethyloctanoate, vinyl butyrate, vinyl acetate, vinyl pivalate, and vinyl versatate.

Examples of the above-described allyl ether include alkyl allyl ethers such as ethyl allyl ether and cyclohexyl allyl ether. Examples of the above-described allyl ester include fatty acid allyl esters such as allyl propionate and allyl acetate.

Examples of the above-described isopropenyl ether include alkyl isopropenyl ethers such as methyl isopropenyl ether. Examples of the above-described isopropenyl ester include isopropenyl acetate. Examples of the above-described metallyl ether include ethylene glycol monometallyl ether, and examples of the metallyl ester include β-metallyl acetate.

Examples of the above-described α-olefin include ethylene, propylene, and isobutylene. Examples of the above-described (meth)acrylate ester include methyl methacrylate.

Among those described above, vinyl ethers, vinyl esters, allyl ethers, and allyl esters are preferable in that they have excellent copolymerizability with fluoroolefins. In addition, alkyl vinyl ethers, fatty acid vinyl esters, alkyl allyl ethers, and fatty acid allyl esters with a linear, branched, or alicyclic alkyl group having 1 to 10 carbon atoms are particularly preferable.

On the other hand, the fluorine-containing resin may be a copolymer between the above-described fluoroolefin and the above-described monomer (such as vinyl ether, vinyl ester, allyl ether, allyl ester, isopropenyl ether, isopropenyl ester, metallyl ether, metallyl ester, α-olefin, and (meth)acrylate ester).

Here, the weight average molecular weight of the fluorine-containing resin is preferably 100,000 or more, more preferably 200,000 or more, and further preferably 400,000 or more. When the weight average molecular weight of the fluorine-containing resin is within the range described above, the compatibility with other components in the coating material for metal sheets becomes satisfactory and a film with high strength is obtained. The above-described weight average molecular weight is a value measured by gel permeation chromatography (a value in terms of styrene).

The coating material for metal sheets contains the above-described fluorine-containing resin preferably in an amount of 0.1 to 100 parts by mass and more preferably in an amount of 40 to 90 parts by mass relative to 100 parts by mass of the solid content of the coating material. When the amount of the fluorine-containing resin is within the range described above, the weather resistance of a coated metal sheet to be obtained by applying the coating material for metal sheets tends to be satisfactory. Meanwhile, since the (meth)acrylic resin is contained in a sufficient amount, the compatibility with other components in the coating material for metal sheets becomes satisfactory.

Here, the (meth)acrylic resin to be combined with the above-described fluorine-containing resin may be thermoplastic, or may be thermosetting.

Examples of the thermoplastic (meth)acrylic resin include polymers containing 70 mol % or more of structural units derived from an alkyl (meth)acrylate ester, relative to the total amount of structural units constituting (meth)acrylic acid. Examples of the alkyl (meth)acrylate ester include alkyl (meth)acrylate esters having 3 to 12 carbon atoms of alkyl (meth)acrylate ester monomers and the like, such as methyl (meth)acrylate, ethyl (meth)acrylate, propyl (meth)acrylate, butyl (meth)acrylate, amyl (meth)acrylate, and octyl (meth)acrylate. The (meth)acrylic resin may include only one of the structures derived from these alkyl (meth)acrylate esters or two or more of them.

In addition, the thermoplastic (meth)acrylic resin may have a structure derived from a monomer other than the above, and may contain, for example, structural units derived from styrene, vinyl toluene, (meth)acrylonitrile, or vinyl chloride.

The weight average molecular weight of the thermoplastic (meth)acrylic resin is preferably 40,000 to 300,000 and more preferably 50,000 to 200,000. The weight average molecular weight of the thermoplastic (meth)acrylic resin is a value measured by GPC (in terms of styrene).

When the fluorine-containing resin is combined with the above-described thermoplastic (meth)acrylic resin, the amount of the thermoplastic (meth)acrylic resin is preferably 150 parts by mass or less and more preferably 10 to 50 parts by mass relative to 100 parts by mass of the fluorine-containing resin. When the thermoplastic (meth)acrylic resin is mixed in within the range described above, the coating material for metal sheets tends to have satisfactory flowability.

On the other hand, the thermosetting (meth)acrylic resin can be a (meth)acrylic resin having crosslinkable reactive groups such as hydroxyl groups, carboxyl groups, glycidyl groups, active halogens, and isocyanate groups. In this case, alkylated melamines, polyols, polyamines, polyamides, polyoxiranes, and the like are used as curing agents for the thermosetting (meth)acrylic resin.

The weight average molecular weight of the thermosetting (meth)acrylic resin is preferably 1,000 to 20,000 and more preferably 2,000 to 10,000. The weight average molecular weight of the thermosetting (meth)acrylic resin is a value measured by GPC (in terms of styrene).

When the fluorine-containing resin is combined with the above-described thermosetting (meth)acrylic resin, the amount of the thermosetting (meth)acrylic resin is preferably 150 parts by mass or less and more preferably 10 to 50 parts by mass relative to 100 parts by mass of the fluorine-containing resin. When the thermosetting (meth)acrylic resin is mixed in within the range described above, the coating material for metal sheets tends to have satisfactory flowability or the like.

The above-described mixture of the fluorine-containing resin and the (meth)acrylic resin may further contain a curing agent. When the mixture contains a curing agent, a crosslinked structure is likely to be formed and a coating film to be obtained is likely to become tougher. Examples of the curing agent include aminoplast curing agents, isocyanate curing agents, polybasic acid curing agents, and polyvalent amine curing agents. The coating material for metal sheets may contain only one of these curing agents or two or more of them.

Examples of the aminoplast curing agent include methylol melamines, methylol guanamines, and methylol ureas. Examples of the methylol melamine include methylol melamines etherified with lower alcohols, such as butylated methylol melamine and methylated methylol melamine, and epoxy-modified methylol melamines. Examples of the methylol urea include alkylated methylol ureas such as methylated methylol urea and ethylated methylol urea.

Examples of the isocyanate curing agent include polyvalent isocyanate compounds and blocked products thereof. Polyvalent isocyanate compounds can be compounds having two or more isocyanate groups. Examples of the polyvalent isocyanate compound include aliphatic polyvalent isocyanate compounds such as ethylene diisocyanate, propylene diisocyanate, tetramethylene diisocyanate, hexamethylene diisocyanate, hexamethylene triisocyanate, and lysine diisocyanate; alicyclic polyvalent isocyanate compounds such as isophorone diisocyanate, dicyclohexylmethane diisocyanate, and diisocyanate methylcyclohexane; and aromatic isocyanate compounds such as m-xylene diisocyanate and p-xylene diisocyanate.

Examples of the modified products and multimeric products of polyvalent isocyanate compounds include urethane modified products, urea modified products, isocyanurate modified products, biuret modified products, allophanate modified products, and carbodiimide modified products.

Examples of the polybasic acid curing agent include long chain aliphatic dicarboxylic acids and aromatic polyvalent carboxylic acids, which may be acid anhydrides thereof.

Examples of the polyvalent amine curing agent include ethylenediamine and ethylenetriamine.

The coating material for metal sheets contains the curing agent described above preferably in an amount of 0.1 to 100 parts by mass and more preferably in an amount of 1 to 50 parts by mass relative to 100 parts by mass of the mixture of the fluorine-containing resin and the (meth)acrylic resin. When the amount of the curing agent is 0.1 parts by mass or more, the hardness of a coating film to be obtained tends to be increased. On the other hand, when the amount of the curing agent is 100 parts by mass or less, the processability and impact resistance of a coated metal sheet to be obtained are likely to be satisfactory.

(Copolymer Between Fluorine-Containing Monomer and (Meth)Acrylic Group-Containing Monomer)

Examples of the copolymer between a fluorine-containing monomer and a (meth)acrylic group-containing monomer include copolymers between fluoroolefins and monomers having a (meth)acrylic group.

The fluorine-containing monomer may be any monomer as long as it contains fluorine, and examples thereof include fluoroolefins having 2 to 3 carbon atoms such as vinylidene fluoride, tetrafluoroethylene, chlorotrifluoroethylene, trifluoroethylene, hexafluoropropylene, and pentafluoropropylene. The copolymer may contain only one of these fluorine-containing monomers or two or more of them.

Meanwhile, the (meth)acrylic group-containing monomer may be any monomer as long as it has a (meth)acrylic group. Examples thereof include (meth)acrylic acid and (meth)acrylate esters. Examples of the (meth)acrylate ester include ethyl methacrylate and methyl methacrylate. The copolymer may contain only one of these (meth)acrylic group-containing monomers or two or more of them. In addition, the copolymer may contain structural units derived from a monomer other than the fluorine-containing monomer and the (meth)acrylic group-containing monomer to the extent that the purposes and effects of the present invention are not impaired. Examples of the monomer other than the fluorine-containing monomer and the (meth)acrylic group-containing monomer include the above-mentioned vinyl ethers, vinyl esters, allyl ethers, allyl esters, isopropenyl ethers, isopropenyl esters, metallyl ethers, metallyl esters, and α-olefins.

The amount of structural units derived from the fluorine-containing monomer is preferably 30 to 70 mol % and more preferably 40 to 60 mol % relative to the total amount of structural units constituting the copolymer described above. On the other hand, the (meth)acrylic group-containing monomer is preferably 30 to 70 mol % and more preferably 40 to 60 mol % relative to the total amount of structural units constituting the copolymer. When the structural units derived from the fluorine-containing monomer is 30 mol % or more, the weather resistance of a coated metal sheet to be obtained by applying the coating material for metal sheets tends to be satisfactory. On the other hand, when the structural units derived from the (meth)acrylic group-containing monomer is 30 mol % or more, the compatibility between the copolymer and other components in the coating material for metal sheets becomes satisfactory.

The weight average molecular weight of the copolymer is preferably 3,000 to 500,000 and more preferably 5,000 to 50,000. When the weight average molecular weight of the copolymer is within the range described above, the compatibility between the copolymer and other components in the coating material for metal sheets becomes satisfactory and a coating film with high strength is obtained. The above-described weight average molecular weight is a value measured by gel permeation chromatography (a value in terms of styrene).

The coating material for metal sheets contains the above-described copolymer preferably in an amount of 0.1 to 100 parts by mass and more preferably in an amount of 40 to 90 parts by mass relative to 100 parts by mass of the solid content of the coating material. When the amount of the copolymer is within the range described above, the weather resistance of a coated metal sheet to be obtained by applying the coating material for metal sheets tends to be satisfactory.

Here, along with the above-described copolymer, a curing agent may be further contained as well. When the coating material for metal sheets contains a curing agent along with the above-described copolymer, a crosslinked structure is likely to be formed and a coating film to be obtained is likely to become tougher. Examples of the curing agent include aminoplast curing agents, isocyanate curing agents, polybasic acid curing agents, and polyvalent amine curing agents. The coating material for metal sheets may contain only one of these curing agents or two or more of them. In addition, they are the same as the curing agents used for the above-mentioned mixture of the fluorine-containing resin and the (meth)acrylic resin.

The coating material for metal sheets contains the curing agent described above preferably in an amount of 0.1 to 100 parts by mass and more preferably in an amount of 1 to 50 parts by mass relative to 100 parts by mass of the copolymer described above. By setting the amount of the curing agent to 0.1 parts by mass or more, the hardness of the coating film tends to be increased. On the other hand, when the amount of the curing agent is 100 parts by mass or less, processability and impact resistance are likely to be satisfactory.

(4) Other Components

The coating material for metal sheets may further contain inorganic particles or organic particles. When the coating material for metal sheets contains them, it becomes easier to adjust the surface roughness of a coating film to be obtained or the like. Here, the average particle diameter of inorganic particles or organic particles is preferably 4 to 80 μm and more preferably 10 to 60 μm. The average particle diameter of inorganic particles or organic particles is a value measured by coulter counter method. Note that the shape of inorganic particles or organic particles is not particularly limited, but from the viewpoint where it is easy to adjust the surface condition of a coating film to be obtained, the shape is preferably generally spherical.

Examples of inorganic particles include silica, barium sulfate, talc, calcium carbonate, mica, glass beads and glass flakes. Examples of organic particles include resin beads composed of an acrylic resin or a polyacrylonitrile resin. Those resin beads may be produced using methods known in the art, or may be commercial products. Examples of commercially available acrylic resin beads include "TAFTIC AR650S (average particle diameter 18 μm)," "TAFTIC AR650M (average particle diameter 30 μm)," "TAFTIC AR650MX (average particle diameter 40 μm)," "TAFTIC AR650MZ (average particle diameter 60 μm)" and "TAFTIC AR650ML (average particle diameter 80 μm)," all of which are manufactured by TOYOBO CO., LTD. Examples of commercially available polyacrylonitrile resin beads include "TAFTIC A-20 (average particle diameter 24 μm)," "TAFTIC YK-30 (average particle diameter 33 μm)," "TAFTIC YK-50 (average particle diameter 50 μm)" and "TAFTIC YK-80 (average particle diameter 80 μm)," all of which are manufactured by TOYOBO CO., LTD.

The amount of inorganic particles and/or organic particles contained in the coating material for metal sheets is appropriately selected depending on a desired surface condition of the coating film or the like. Normally, the total amount of inorganic particles and/or organic particles may be 1 to 40 parts by mass relative to 100 parts by mass of the solid content of the coating material for metal sheets.

In addition, the coating material for metal sheets may further contain a coloring pigment as necessary. The average particle diameter of the coloring pigment may be, for example, 0.2 to 2.0 μm. Examples of the coloring pigment include titanium oxide, iron oxide, yellow oxide of iron, phthalocyanine blue, carbon black and cobalt blue. When the coating material for metal sheets contains a coloring pigment, the amount thereof is preferably 20 to 60 parts by mass and more preferably 30 to 55 parts by mass relative to 100 parts by mass of the solid content of the coating material for metal sheets.

Furthermore, the coating material for metal sheets may further contain a wax as necessary. Examples of the wax include, but are not limited to, polyolefin waxes (polyethylene, polypropylene, and the like), fluorinated waxes (polytetrafluoroethylene, polychlorotrifluoroethylene, polyvinylidene fluoride, polyvinyl fluoride, and the like), paraffin waxes, and stearic acid waxes. Also, the amount of the wax is appropriately selected depending on the type of wax and the like, but it can be about 2 to 15 parts by mass relative to 100 parts by mass of the solid content of the coating material for metal sheets.

In addition, the coating material for metal sheets may contain an organic solvent as necessary. The organic solvent is not particularly limited as long as it can sufficiently dissolve or disperse the above-described silicone resin, zinc carboxylate salt catalyst, fluorine-containing resin and its curing agent, acrylic resin, inorganic particles, organic particles, and the like. Examples of the organic solvent include hydrocarbon solvents such as toluene, xylene, Solvesso® 100 (trade name; manufactured by ExxonMobil Chemical), Solvesso® 150 (trade name; manufactured by ExxonMobil Chemical), and Solvesso® 200 (trade name; manufactured by ExxonMobil Chemical); ketone solvents such as methyl ethyl ketone, methyl isobutyl ketone, cyclohexanone, and isophorone; ester solvents such as ethyl acetate, butyl acetate, ethylene glycol monoethyl ether acetate, and dimethyl phthalate; alcohol solvents such as methanol, isopropyl alcohol, and n-butyl alcohol; ether alcohol solvents such as ethylene glycol monoethyl ether and diethylene glycol monobutyl ether; and the like. The coating material may include only one of these organic solvents or two or more of them. Among them, isophorone, xylene, ethylbenzene, cyclohexanone, and dimethyl phthalate are preferred from the compatibility with the resin or the like.

(5) Method for Preparing Coating Material

A method for preparing the coating material is not particularly limited. The coating material may be prepared by mixing each of the above materials, followed by stirring or dispersing the same, in the same manner as coating materials known in the art. Note that the silicone resin may be premixed with other components. Alternatively, materials other than the silicone resin may be premixed and the silicone resin may be mixed in later.

2. Method for Producing Coated Metal Sheet

In the following, the method for producing a coated metal sheet using the above-mentioned coating material for metal sheets will be described. The method for producing a coated metal sheet can be a method including a step for forming a coating film on the surface of a metal sheet by applying and curing the above-mentioned coating material for metal sheets, and a step for subjecting the coating film to a flame treatment.

Here, for the metal sheet to which the coating material for metal sheets is to be applied, any metal sheets generally used as building boards may be used. Examples of such a metal sheet include plated steel sheets such as hot-dip Zn-55% Al alloy-plated steel sheets; steel sheets such as normal steel sheets and stainless-steel sheets; aluminum sheets; copper sheets; and the like. The metal sheet may have a chemical conversion film, an undercoat coating film or the like formed on its surface as long as it does not hinder the effects of the present invention. Furthermore, the metal sheet may be subjected to a processing for forming irregularities such as embossing and drawing as long as it does not impair the effects of the present invention.

The thickness of the metal sheet is not particularly limited, and is appropriately selected depending on applications and other factors. For example, when the coated metal sheet is used for a metal siding material, the thickness of the metal sheet may be 0.15 to 0.5 mm.

The method for applying the above-mentioned coating material for metal sheets to the surface of the metal sheet is not particularly limited, and it may be appropriately selected from methods known in the art. Examples of the method for applying the coating material for metal sheets include roll coating method, curtain flow method, spin coating method, air-spray method, airless-spray method, and dip-and-draw up method. Among them, the roll coating method is preferred from the viewpoint where a coating film with a desired thickness is likely to be obtained efficiently.

In addition, the method for curing the coating material for metal sheets may be baking by heating, for example. The temperature during the baking treatment is not particularly limited as long as it is possible to activate the above-mentioned zinc carboxylate salt catalyst to cure the silicone resin, or to cure the above-described mixture of the fluorine-containing resin and the (meth)acrylic resin, or the copolymer between the fluorine-containing monomer and the (meth)acrylic group-containing monomer, while preventing decomposition of the resins and other components in the coating material. Normally, the temperature is preferably 100 to 300° C., more preferably 180 to 300° C., and further preferably 240 to 280° C. The duration for the baking treatment is not particularly limited, and preferably 3 to 90 seconds, more preferably 10 to 70 seconds, and further preferably 40 to 60 seconds from the same viewpoint as described above.

In addition, upon the baking of the coating material for metal sheets, wind may be blown such that the wind velocity on the sheet surface is 0.9 m/s or more in order to cure the coating material for metal sheets within a short time. In the coating material for metal sheets mentioned above, the silicone resin is bonded to other components via hydrogen bonding. Therefore, even if the coating material for metal sheets is cured while wind is blown, the silicone resin is unlikely to be evaporated and the heating apparatus is unlikely to be fouled.

Here, the thickness of the coating film formed on the metal sheet is appropriately selected depending on an application of the coated metal sheet and the like, but it is normally in the range of 3 to 30 μm. The thickness is a value determined through gravimetric method from the specific gravity of the baked coating film and the weight difference of the coated metal sheet before and after the removal of the coating film by sandblasting or the like. When the coating film is too thin, durability and concealing properties of the coating film may be insufficient. On the other hand, when the coating film is too thick, production costs are increased and popping may easily occur during the baking.

Meanwhile, the method for subjecting the coating film (coating material after curing) to a flame treatment is not particularly limited, and can be the same as a normal flame treatment method. When the coating film (cured film) obtained from the above-mentioned coating material for metal sheets is subjected to a flame treatment, hydrocarbon groups (such as methyl groups or phenyl groups) of the silicone resin on the surface of the coating film are decomposed and silanol groups or siloxane bonds are produced. As a result of this, the hydrophilicity of the surface of the coating film is enhanced and the rain-streak stain resistance is enhanced.

The flame treatment may be, for example, a method in which a metal sheet having a coating film formed thereon is placed on a carrier such as a belt conveyor, and while the metal sheet is moved in a certain direction, flame is projected onto the coating film with a burner for flame treatment.

Here, the amount of flame treatment is preferably 30 to 1,000 kJ/m$^2$ and more preferably 100 to 600 kJ/m$^2$. Note that the "amount of flame treatment" in the present specification refers to the amount of heat per unit area of a coated metal sheet, which is calculated on the basis of the amount supplied of a combustion gas such as LP gas. The amount of flame treatment can be adjusted according to the distance between the burner head of the burner for flame treatment and the surface of the coating film, the conveying speed of the coating film, and the like. When the amount of flame treatment is less than 30 kJ/m$^2$, uneven treatment may occur and it is difficult to evenly hydrophilize the surface of the coating film. On the other hand, when the amount of flame treatment is greater than 1,000 kJ/m$^2$, the coating film may be oxidized and turn yellow.

Moreover, prior to the flame treatment, a preheating treatment for heating the surface of the coating film to 40° C. or higher may be carried out. When a flame is applied to a coating film formed on the surface of a metal sheet having a high thermal conductivity (for example, a metal sheet having a thermal conductivity of 10 W/mK or more), water vapor generated by the combustion of the combustible gas is cooled and becomes water, which temporarily stays on the surface of the coating film. Then, that water may absorb energy upon the flame treatment to become water vapor, thereby inhibiting the flame treatment. Responding to this, by heating the surface of the coating film (metal sheet) in advance, the generation of water upon the application of flame can be suppressed.

A method for preheating the coating film is not particularly limited, and a heating apparatus generally referred to as a drying oven may be used. For example, a batch-type drying oven (also referred to as a "safe-type oven") may be used. Specific examples thereof include a low temperature-thermostat manufactured by Isuzu Seisakusho Co., Ltd (Model: Mini-Katarina MRLV-11), an automatic ejection dryer manufactured by Tojo Netsugaku Co., Ltd (Model: ATO-101) and a simple dryer having an explosion-proof specification manufactured by Tojo Netsugaku Co., Ltd (Model: TNAT-1000).

EXAMPLES

Hereinafter, the present invention will be described in detail with reference to Examples; however, the present invention is not limited by these Examples.

1. Preparation of Coating Materials for Metal Sheets

Coating material for metal sheets was prepared according to the following method.

1-1. Materials

The following resin components, catalysts, silicone resins, and organosilicates were used in each of Examples and Comparative Examples.

[Resin Components]
 Composition obtained by mixing 100 parts by mass of a polyvinylidene fluoride resin with 43 parts by mass of a thermoplastic acrylic resin (DICFLOW-C: manufactured by DIC Corporation)
 Copolymer between a fluoroolefin and an acrylate ester (ZAFLON: manufactured by Toagosei Co., Ltd.)

[Catalysts]
 Zinc bis(2-ethylhexanoate)
 Zinc caproate
 Zinc oleate
 Block sulfonic acid catalyst (pH 7.0): Para-toluenesulfonate ester having a structure represented by the following chemical formula:

[Formula 6]

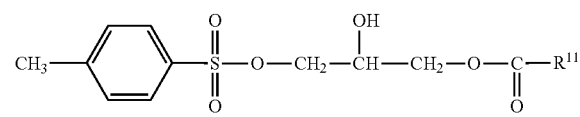

($R^{11}$ represents a branched alkyl chain having 10.4 carbon atoms on average)

[Silicone Resins]
 Silicone resins were prepared as follows.
 Preparation of Methyl-Based Silicone Resin A
 Into a 2-liter flask, 408 g (3.0 moles) of methyltrimethoxysilane was charged. Then, 800 g of water was added at 10° C. or lower and mixed well. Next, under ice cooling, 216 g (12.0 moles) of an aqueous 0.05 N hydrochloric acid solution was added dropwise at 5° C. over 40 minutes. After completion of the dropping, the mixture was stirred at 10° C. for 6 hours to complete hydrolysis and dehydrative condensation. As a result of this, a prepared solution containing methyl-based silicone resin A was obtained. Subsequently, from that prepared solution, methanol produced by the hydrolysis was distilled off under reduced pressure at 70° C. and 60 mmHg for 1 hour. The prepared solution after the distillation of methanol was clouded, and after leaving it at rest overnight, it was separated into 2 layers. The lower layer was a precipitated silicone resin that was insoluble in water. To that prepared solution, 469 g of methyl isobutyl ketone (MIBK) was added and the mixture was stirred at room temperature for 1 hour. As a result of this, the precipitated silicone resin was completely dissolved in MIBK. Then, the prepared solution was left at rest to be separated into the aqueous layer and the MIBK layer. Subsequently, the aqueous layer, which was the lower layer, was removed using a flask equipped with a cock to obtain a colorless and transparent silicone resin solution having a solid content of 50 mass %. The weight average molecular weight, the molecular weight distribution, the T units (structure derived from trifunctional silicone resin)/D units (structure derived from bifunctional silicone resin), and the amount of silanol groups relative to the amount of Si atoms of silicone resin A are shown in Table 1. Note that the weight average molecular weight and the molecular weight distribution were specified by GPC analysis. Furthermore, the T units/D units and the amount of silanol groups were specified by analysis with $^{29}$Si-NMR and $^{1}$H-NMR.

Synthesis of Methyl-Based Silicone Resin B

Into a 2-liter flask, 286 g (2.1 moles) of methyltrimethoxysilane and 108 g (0.9 moles) of dimethyldimethoxysilane were charged. Then, 800 g of water was added at 10° C. or lower and mixed well. Next, under ice cooling, 198 g (11.0 moles) of an aqueous 0.05 N hydrochloric acid solution was added dropwise at 5 to 25° C. over 20 minutes. After completion of the dropping, the mixture was stirred at 15° C. for 6 hours to carry out hydrolysis and dehydrative condensation. After completion of the dropping, the same operations were carried out as Synthesis of Methyl-Based Silicone Resin A to obtain silicone resin solutions containing methyl-based silicone resin B having a solid content of about 50 mass %. The weight average molecular weight, the molecular weight distribution, the T units/D units, and the amount of silanol groups relative to the amount of Si atoms of silicone resin B are shown in Table 1.

TABLE 1

| Silicone resin | Weight average molecular weight | Molecular weight distribution (Mw/Mn) | T units/ D units | Amount of silanol groups relative to amount of Si atoms (mol %) |
|---|---|---|---|---|
| A | 2,600 | 2.4 | 100/0 | 29 |
| B | 2,900 | 2.7 | 71/29 | 25 |

Synthesis of Methyl/Phenyl-Based Silicone Resin C

Into a 2-liter flask, 272 g (2.0 moles) of methyltrimethoxysilane and 119 g (1.0 mole) of phenyltrimethoxysilane were charged. Then, 800 g of water was added at 10° C. or lower and mixed well. Next, under ice cooling, 198 g (11.0 moles) of an aqueous 0.05 N hydrochloric acid solution was added dropwise at 5 to 25° C. over 30 minutes. After completion of the dropping, the mixture was stirred at 10° C. for 6 hours to complete hydrolysis and dehydrative condensation. After completion of the dropping, the same operations were carried out as Synthesis of Methyl-Based Silicone Resin A to obtain a prepared solution containing methyl/phenyl-based silicone resin C having a solid content of about 50 mass %. The weight average molecular weight, the molecular weight distribution, the T units/D units, the content ratio of methyl groups to phenyl groups (methyl/phenyl), and the amount of silanol groups relative to the amount of Si atoms of silicone resin C are shown in Table 2.

Synthesis of Methyl/Phenyl-Based Silicone Resin D

Into a 2-liter flask, 109 g (0.8 moles) of methyltrimethoxysilane, 198 g (1.0 mole) of phenyltrimethoxysilane and 144 g (1.2 moles) of dimethyldimethoxysilane were charged. Then, 800 g of water was added at 10° C. or lower and mixed well. Next, under ice cooling, 216 g (12.0 moles) of an aqueous 0.05 N hydrochloric acid solution was added dropwise at 5 to 25° C. over 40 minutes, and the mixture was stirred at 10° C. for 6 hours to complete hydrolysis and dehydrative condensation. After completion of the dropping, the same operations were carried out as Synthesis of Methyl-Based Silicone Resin A to obtain silicone resin solutions containing methyl/phenyl-based silicone resin D having a solid content of about 50 mass %. The weight average molecular weight, the molecular weight distribution, the T units/D units, the content ratio of methyl groups to phenyl groups (methyl/phenyl), and the amount of silanol groups relative to the amount of Si atoms of silicone resin D are shown in Table 2.

TABLE 2

| Silicone resin | Weight average molecular weight | Molecular weight distribution (Mw/Mn) | T units/ D units | Methyl/ phenyl | Amount of silanol groups relative to amount of Si atoms (mol %) |
| --- | --- | --- | --- | --- | --- |
| C | 3,100 | 2.9 | 100/0 | 66/34 | 27 |
| D | 4,200 | 3.1 | 60/40 | 66/34 | 25 |

[Organosilicates]

The following organosilicates were used.

Methyl silicate E (condensate of tetramethoxysilane): methyl silicate 53A, manufactured by Colcoat Co., Ltd., weight average molecular weight (Mw) of 840, number average molecular weight (Mn) of 610, Mw/Mn=1.4

Ethyl silicate F (condensate of tetraethoxysilane): ethyl silicate 48, manufactured by Colcoat Co., Ltd., weight average molecular weight (Mw) of 1,300, number average molecular weight (Mn) of 850, Mw/Mn=1.5

1-2. Preparation

To a resin component (mixture of a polyvinylidene fluoride resin and an acrylic resin), titanium oxide having an average particle diameter of 0.28 μm ((pigment), manufactured by Tayca Corporation, JR-603), hydrophobic silica A having an average particle diameter of 5.5 m (manufactured by FUJI SILYSIA CHEMICAL, LTD., SILYSIA 456), and hydrophobic silica B having an average particle diameter of 12 μm (manufactured by FUJI SILYSIA CHEMICAL, LTD., SILYSIA 476) were added, the amounts of which were 45 mass %, 4 mass %, and 3 mass %, respectively, relative to the solid content of the coating material. Furthermore, catalysts shown in Table 3 were added such that the amount of the catalysts was 0.30 mass % relative to the solid content of the coating material for metal sheets. Note that, for the block sulfonic acid catalyst, it was added such that the amount of sulfonic acid after the blocking group was desorbed was 1.0 mass % relative to the solid content of the coating material for metal sheets.

Furthermore, as shown in Table 3, each of the methyl-based silicone resins, methyl/phenyl-based silicone resins, methyl silicate, or ethyl silicate was added such that the amount thereof is 5 mass % relative to the solid content of the coating material. In addition, for the coating material for metal sheets to which methyl silicate or ethyl silicate was added, triethyl orthoformate was added such that the amount thereof is 5 mass % relative to the solid content of the coating material for metal sheets.

2. Evaluation

Using the above coating materials for metal sheets, coated metal sheets were produced and evaluated as follows. Results are shown in Table 3.

2-1. Arrangement of Metal Sheet

An A4-sized (210 mm×297 mm) hot-dip Zn-55% Al alloy-plated steel sheet having a sheet thickness of 0.27 mm and a per-side plating deposition amount of 90 g/m$^2$ was arranged as a metal sheet, and the surface thereof was alkali-degreased. Subsequently, an application-type chromate treatment liquid (NRC300NS, manufactured by Nippon Paint Co., Ltd.) was applied on the surface of the metal sheet such that the Cr deposition amount was 50 mg/m$^2$. Furthermore, an epoxy resin-based primer coating material (800P, manufactured by Nippon Fine Coatings Inc.) was applied using a roll coater such that the thickness of the cured film was 5 μm. Subsequently, the resultant sheet was baked such that the highest temperature that the metal sheet reached was 215° C., thereby obtaining a plated steel sheet having a primer coating film formed thereon (hereinafter, also simply referred to as a "plated steel sheet").

2-2. Application and Curing of Coating Materials

The coating materials for metal sheets prepared as mentioned above were stored in a thermostatic chamber at 40° C. for 15 days, and then applied to the above-mentioned plated steel sheet using a roll coater such that the thickness of the cured film was 20 μm. Subsequently, they were baked for 60 seconds such that the highest temperature that the sheet reached was 260° C. and the wind velocity on the sheet surface was 0.9 μm/s.

2-3. Flame Treatment

The coating films obtained by applying the coating materials for metal sheets of Examples 1 to 16 and Comparative Examples 1 to 4 were subjected to a frame treatment by the following method. Note that, for Comparative Examples 5 and 6, no frame treatment was carried out.

As a burner for flame treatment, F-3000 manufactured by Flynn Burner Corporation (USA) was used. As a combustible gas, a mixed gas obtained by mixing LP gas (combustion gas) and clean dry air (LP gas:clean dry air (volume ratio)=1:25) using a gas mixer was used. In addition, the flow rate of each gas was adjusted such that, for 1 cm$^2$ of a burner port of the burner, the flow rate of the LP gas (combustion gas) was 1.67 L/min and the flow rate of the clean dry air was 41.7 L/min. The length of the burner port of the burner head in the conveyance direction of a coating film was set to be 4 mm. The length of the burner port of the burner head in the direction perpendicular to the conveyance direction was set to be 450 mm. Furthermore, the distance between the burner port of the burner head and the surface of the coating film was set to be 20 mm depending on an amount desired of flame treatment. Moreover, the conveyance speed of the coating film was set to be 24 m/min, thereby adjusting the amount of flame treatment to be 265 kJ/m².

2-4. Yellowing of Coating Films

The b value in the Hunter Lab color system was measured for the obtained coated metal sheets, and that b value was used to evaluate the yellowing of the coating films. The measurement of the b value was carried out using "CM3700d" manufactured by Konica Minolta Optics, Inc. The color of the coating film without addition of the catalyst was used as the reference, and yellowing of the coating films was evaluated according to the degree of change (Δb value) from the color of the coating film described above. More specifically, the following criteria were used to conduct the evaluation.

○: Δb value is less than 0.5 xB: Δb value is 0.5 or more 2-5. Evaluation of Storage Stability of Coating Materials for Metal Sheets Each of the coating materials for metal sheets was stored in a thermostatic chamber at 40° C., and the viscosity of coating materials after 15 days, 1 month, 3 months, and 6 months was measured with a B-type viscometer. Then, by comparing viscosities before and after the storage, evaluation was carried out on the basis of the following criteria.

⊚: rising rate of coating material viscosity is less than 30% before and after storage in thermostatic chamber ○: rising rate of coating material viscosity is 30% or more and less than 100% before and after storage in thermostatic chamber Δ: rising rate of coating material viscosity is 100% or more before and after storage in thermostatic chamber x: gelation occurs.

Note that Δ, ○ and ⊚ were evaluated as passing.

2-6. Measurement of Water Contact Angle

The water contact angle was measured for the surface of the coating film of the coated metal sheet produced using the coating material prepared in each of Examples and Comparative Examples. The measurement was carried out by forming a 0.01 cc droplet of purified water in a thermostat and humidistat chamber at an atmospheric temperature of 23±2° C. and a relative humidity of 50±5%, and using a contact angle measuring device DM901 manufactured by Kyowa Interface Science, Inc.

2-7. Evaluation of Rain-Streak Stain Resistance

The rain-streak stain resistance was evaluated as follows.

Each of the above-mentioned coated metal sheets was attached to a vertical exposure board. Above the coated metal sheet, a corrugated sheet was further attached at an angle of 20° relative to the ground. Upon this, the corrugated sheet was installed such that rainwater ran down the surface of the coated metal sheet as streaks. In this state, an outdoor exposure test was carried out for 6 months, and the state of stain adhesion was then observed. The rain-streak stain resistance was evaluated using brightness difference (ΔL) of the coated metal sheet before and after the exposure as follows.

⊚: ΔL was less than 1 (no rain-streak stain was visible)

○: ΔL was less than 1 (rain-streak stains were hardly visible)

x: ΔL was 1 or more and less than 2 (rain-streak stains were not noticeable, but visible)

xx: ΔL was 2 or more (stains were noticeable)

Note that ○ and ⊚ were evaluated as passing.

TABLE 3

| | No. | Resin composition | Catalyst | Hydrophilizing agent | Type | Method for treating surface of coating film | Storage stability test of coating material 15 days | 1 month | 3 months | 6 months | Yellowing of coating film | Water contact angle (°) | Evaluation of rain-streak stain resistance |
|---|---|---|---|---|---|---|---|---|---|---|---|---|---|
| Example | 1 | Fluorine-containing resin + acrylic resin (mixture) | Zinc bis(2-ethylhexanoate) | Methyl-based silicone resin | A | Flame | ⊚ | ⊚ | ○ | ○ | ○ | 28 | ⊚ |
| | 2 | | | | B | Flame | ⊚ | ⊚ | ○ | ○ | ○ | 32 | ⊚ |
| | 3 | | | Methyl/phenyl-based silicone resin | C | Flame | ⊚ | ⊚ | ○ | ○ | ○ | 34 | ⊚ |
| | 4 | | | | D | Flame | ⊚ | ⊚ | ⊚ | ○ | ○ | 33 | ⊚ |
| | 5 | | Zinc caproate | Methyl-based silicone resin | A | Flame | ⊚ | ⊚ | ○ | ○ | ○ | 25 | ⊚ |
| | 6 | | | | B | Flame | ⊚ | ⊚ | ○ | ○ | ○ | 28 | ⊚ |
| | 7 | | Zinc oleate | | A | Flame | ⊚ | ⊚ | ⊚ | ○ | ○ | 32 | ⊚ |
| | 8 | | | | B | Flame | ⊚ | ⊚ | ⊚ | ○ | ○ | 33 | ⊚ |
| | 9 | Fluorine-containing monomer + acrylic monomer (copolymer) | Zinc bis(2-ethylhexanoate) | Methyl-based silicone resin | A | Flame | ⊚ | ⊚ | ○ | ○ | ○ | 28 | ⊚ |
| | 10 | | | | B | Flame | ⊚ | ⊚ | ○ | ○ | ○ | 35 | ⊚ |
| | 11 | | | Methyl/phenyl-based silicone resin | C | Flame | ⊚ | ⊚ | ⊚ | ○ | ○ | 40 | ⊚ |
| | 12 | | | | D | Flame | ⊚ | ⊚ | ⊚ | ○ | ○ | 39 | ⊚ |
| | 13 | | Zinc caproate | Methyl-based silicone resin | A | Flame | ⊚ | ⊚ | ○ | ○ | ○ | 29 | ⊚ |
| | 14 | | | | B | Flame | ⊚ | ⊚ | ○ | ○ | ○ | 30 | ⊚ |
| | 15 | | Zinc oleate | | A | Flame | ⊚ | ⊚ | ⊚ | ○ | ○ | 39 | ⊚ |
| | 16 | | | | B | Flame | ⊚ | ⊚ | ⊚ | ○ | ○ | 40 | ⊚ |
| Comparative Example | 1 | Fluorine-containing resin + acrylic resin (mixture) | Block sulfonic acid catalyst | Methyl-based silicone resin | A | Flame | ⊚ | ⊚ | ○ | ○ | X | 38 | ⊚ |
| | 2 | | | | B | Flame | ⊚ | ⊚ | ○ | ○ | X | 40 | ⊚ |
| | 3 | Fluorine-containing monomer + acrylic monomer (copolymer) | | | A | Flame | ⊚ | ⊚ | ○ | ○ | X | 37 | ⊚ |
| | 4 | | | | B | Flame | ⊚ | ⊚ | ○ | ○ | X | 45 | ⊚ |
| | 5 | Fluorine-containing resin + acrylic resin | Zinc bis(2-ethylhexanoate) | Methyl silicate | E | Untreated | ○ | X | X | X | ○ | 63 | Δ |

TABLE 3-continued

| No. | Resin composition | Catalyst | Hydrophilizing agent Type | | Method for treating surface of coating film | Storage stability test of coating material | | | | Evaluation of coating film | | |
|---|---|---|---|---|---|---|---|---|---|---|---|---|
| | | | | | | 15 days | 1 month | 3 months | 6 months | Yellowing of coating film | Water contact angle (°) | Evaluation of rain-streak stain resistance |
| 6 | (mixture) | | Ethyl silicate | F | Untreated | ○ | X | X | X | ○ | 59 | ○ |
| 7 | Fluorine-containing monomer + acrylic | | Methyl silicate | E | Untreated | ○ | X | X | X | ○ | 60 | Δ |
| 8 | monomer (copolymer) | | Ethyl silicate | F | Untreated | ○ | X | X | X | ○ | 59 | ○ |

As shown in Table 3, when the zinc carboxylate salt catalyst was used as a curing catalyst for the silicone resin, no yellowing of the coating film occurred in any of the coating materials for metal sheets, and the storage stability was also stable for 3 months (Examples 1 to 16).

In contrast, for the coating materials for metal sheets containing methyl silicate or ethyl silicate, the viscosity became higher after 15 days and most of them were gelated after 1 month (Comparative Examples 5 to 8).

Meanwhile, even in the coating materials for metal sheets containing the silicone resin, use of the block sulfonic acid catalyst as the curing catalyst resulted in yellowing of the coating films (Comparative Examples 1 to 4), although the storage stability was satisfactory.

The present application claims priority based on Japanese Patent Application No. 2020-021403 filed on Feb. 12, 2020, the entire contents of which including the specification are incorporated herein by reference.

INDUSTRIAL APPLICABILITY

According to the coating material for metal sheets of the present invention, yellowing is less likely to occur in the coating film. Furthermore, the storage stability of the coating material for metal sheets is very satisfactory. In addition, the coating material for metal sheets can provide a coated metal sheet that is less likely to suffer the occurrence of rain-streak stains and has high scratch resistance. Accordingly, the coating material for metal sheets is very useful as a coating material for manufacturing exterior building materials for various buildings and the like.

What is claimed is:

1. A coating material for metal sheets, comprising:
   at least one of a mixture of a fluorine-containing resin and a (meth)acrylic resin and a copolymer of a fluorine-containing monomer and a (meth)acrylic group-containing monomer;
   a silicone resin; and
   a zinc carboxylate salt catalyst, wherein
   a weight average molecular weight of the fluorine-containing resin is 100,000 or more;
   a weight average molecular weight of the (meth)acrylic resin is 1,000 to 20,000,
   a weight average molecular weight of the copolymer is 3,000 to 500,000; and
   an amount of the silicone resin is 1 to 10 parts by mass relative to 100 parts by mass of a solid content of the coating material.

2. The coating material for metal sheets according to claim 1, wherein the zinc carboxylate salt catalyst has a structure represented by a general formula (1):

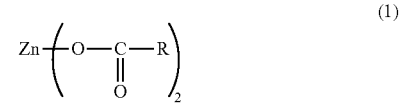

wherein R in the general formula (1) represents a linear or branched alkyl group comprising 1 to 18 carbon atoms or an aryl group comprising 6 to 18 carbon atoms.

3. The coating material for metal sheets according to claim 2, wherein the general formula (1) is zinc bis(2-ethylhexanoate).

4. The coating material for metal sheets according to claim 1, wherein the silicone resin contains silanol groups in an amount of 5 to 50 mol % relative to a total number of moles of Si atoms.

5. A method for producing a coated metal sheet, comprising:
   forming a coating film on a surface of a metal sheet by applying and curing the coating material for metal sheets according to claim 1; and
   subjecting the coating film to a flame treatment.

* * * * *